United States Patent
Forbes et al.

(10) Patent No.: US 6,298,944 B1
(45) Date of Patent: Oct. 9, 2001

(54) METHOD OF FORMING MULTI-PURPOSE HUNTING APPAREL

(75) Inventors: David R. Forbes; Carman S. Forbes, both of Cedar Rapids, IA (US)

(73) Assignee: Hunter's Specialties, Inc., Cedar Rapids, IA (US)

( * ) Notice: Subject to any disclaimer, the term of this patent is extended or adjusted under 35 U.S.C. 154(b) by 33 days.

(21) Appl. No.: 09/006,137

(22) Filed: Jan. 13, 1998

(51) Int. Cl.[7] ..................................................... A47L 3/04
(52) U.S. Cl. ................................... 182/3; 182/9; 182/135
(58) Field of Search .................................. 182/3, 9, 135, 182/136; 2/94, 102; 248/218.4, 219.1

(56) References Cited

U.S. PATENT DOCUMENTS

| | | |
|---|---|---|
| 191,027 | 5/1877 | Case et al. . |
| 262,577 | 8/1882 | Day . |
| 1,879,341 | 9/1932 | Lapham . |
| 3,074,074 | 1/1963 | Lovering ...................................... 2/94 |
| 3,701,395 | * 10/1972 | Theobold .................................. 182/3 |
| 4,076,101 | * 2/1978 | Himmelrich .............................. 182/3 |
| 4,194,257 | * 3/1980 | Martin et al. ........................ 182/3 X |
| 4,273,216 | * 6/1981 | Weissmann ................................ 182/3 |
| 4,706,858 | 11/1987 | Whatley ................................ 224/184 |
| 4,722,501 | 2/1988 | Ruhl .................................... 248/218.4 |
| 4,905,989 | 3/1990 | Colvin et al. ............................ 272/70 |
| 4,955,456 | 9/1990 | Mulkey ...................................... 182/3 |
| 4,973,277 | * 11/1990 | Khanamirian ........................ 182/3 X |
| 5,014,359 | 5/1991 | Hanson ........................................ 2/94 |
| 5,180,030 | * 1/1993 | Smaby ................................. 182/3 X |
| 5,195,187 | * 3/1993 | Yang ....................................... 2/102 |
| 5,220,976 | * 6/1993 | Gunter ...................................... 182/3 |
| 5,265,782 | 11/1993 | McNamara ............................ 224/204 |
| 5,301,911 | 4/1994 | Beauchemin ...................... 248/218.4 |
| 5,325,818 | * 7/1994 | Leach .................................. 182/3 X |
| 5,329,884 | * 7/1994 | Bell ...................................... 182/3 X |
| 5,617,582 | 4/1997 | Burwell .................................... 2/102 |
| 5,619,751 | 4/1997 | Ray et al. ................................. 2/102 |
| 5,697,329 | * 12/1997 | Bell et al. ........................... 182/3 X |
| 5,738,046 | * 4/1998 | Williams et al. .................... 182/3 X |
| 5,797,143 | * 8/1998 | Buxton .................................... 2/102 |
| 5,799,329 | * 9/1998 | Hauschild ................................ 2/102 |

* cited by examiner

*Primary Examiner*—Bruce A. Lev
(74) *Attorney, Agent, or Firm*—Simmons, Perrine, Albright & Ellwood, PLC

(57) ABSTRACT

A method and apparatus for carrying, using and storing in the field various hunting supplies including a back pad and other material is disclosed. A vest with a padded back and sides containing pockets is worn by a hunter in to the woods. When the hunter arrives at a tree a tree belt is extended and secured around the tree and the vest is removed and hung from the belt. The padded back is positioned so that the hunter can lean against it while on stand. The sides of the vest are extended around the tree so that the pockets are easily reachable by the hunter while on stand. The tree belt is used for holding other hunting accessories as well.

2 Claims, 2 Drawing Sheets

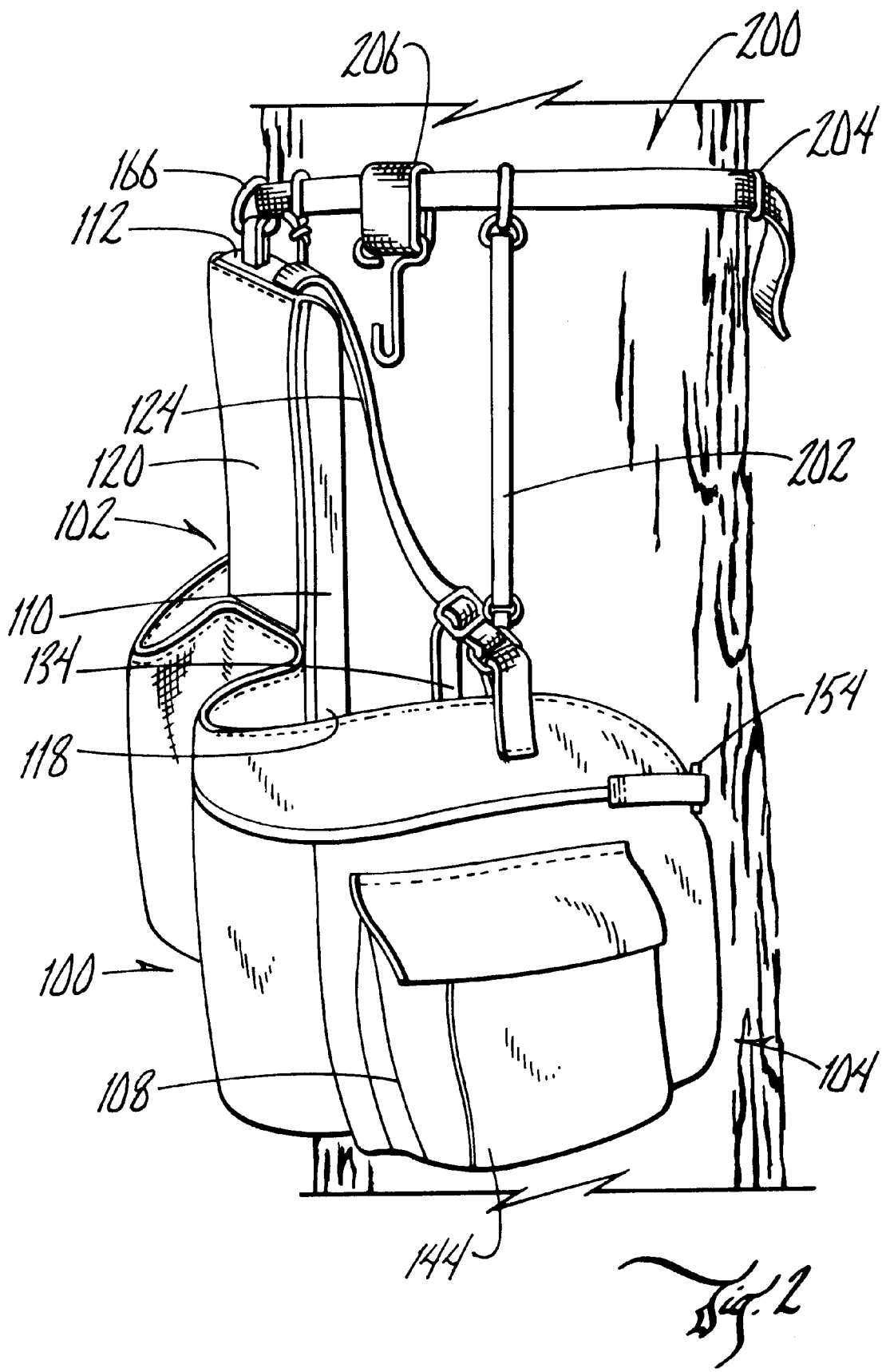

US 6,298,944 B1

METHOD OF FORMING MULTI-PURPOSE HUNTING APPAREL

FIELD OF THE INVENTION

The present invention generally relates to the apparel industry and even more particularly relates to new methods and apparatuses for hanging hunting accessories from a tree.

BACKGROUND

In the past, hunters often have encountered difficulty in carrying, and quietly and efficiently utilizing, hunting accessories in the field. For example, hunters may try to carry into the field, and often into elevated tree stands, accessories such as pads or cushions (to aid the hunter in comfortably remaining motionless for extended periods of time), game calls, scents, gloves, hats, ammunition, and many other items. Often hunters will carry either a bow or a gun when they walk to their tree stand, making it more difficult to carry the above-mentioned accessories. Once the hunter is in the stand, space to stand and move about is usually limited. Additionally, once the hunter is in the tree stand, the hunter needs to quickly get all these accessories organized and positioned for use during the hunt. The sooner the hunter is able to get "settled in", the sooner the hunter will be able to sit quietly and thereby decrease the likelihood that game will be alerted to the hunter's position by any noise being made in the process.

For example, a hunter may attempt to carry a cushioning pad draped over a bow or gun in one hand, a string or bag of game calls around the hunter's neck, and some camouflage netting in another hand, all while trying to quietly traverse a steep brush-covered hillside.

While this or other approaches are possible, they have several shortcomings. First of all, the pad could be dropped, the calls might make noise as they clang together or slide around the hunter's neck, and the netting might become tangled in the brush. Additionally once this hunter arrives at the stand, there would be considerable time consumed and noise made in the process of organizing these accessories.

Consequently, there exists a need for improved methods and apparatuses for carrying and efficiently arranging and using hunting accessories.

SUMMARY OF THE INVENTION

It is an object of the present invention to provide an easy way to carry several accessories to a tree stand.

It is a feature of the present invention to include an accessory holding apparatus which is worn on the hunter's body while in transit to a stand.

It is an advantage of the present invention to consolidate several accessories into an easily transportable assembly.

It is another object of the present invention to reduce the time in the tree stand needed to organize the accessories into a workable and efficient arrangement.

It is another feature of the present invention to provide the ability to hang the accessory-holding apparatus around the tree.

It is another advantage of the present invention to provide the ability to rapidly deploy the various accessories around the tree in an efficient manner.

The present invention is a method and apparatus for carrying and utilizing hunting accessories which is designed to satisfy the aforementioned needs, provide the previously stated objects, include the above-listed features, and achieve the already articulated advantages. In the present invention, the difficulty in carrying various accessories and the time required to deploy these accessories while in the tree stand is reduced.

Accordingly, the present invention is a method and apparatus for deploying around a tree trunk a body-worn hunting accessory-retaining apparatus.

BRIEF DESCRIPTION OF THE DRAWINGS

The invention may be more fully understood by reading the following description of preferred embodiments of the invention, in conjunction with the appended drawings wherein:

FIG. 2 is a perspective view of a preferred embodiment of the present invention which shows the vest as it would be configured when it is attached to a tree.

DETAILED DESCRIPTION

Figure 1:
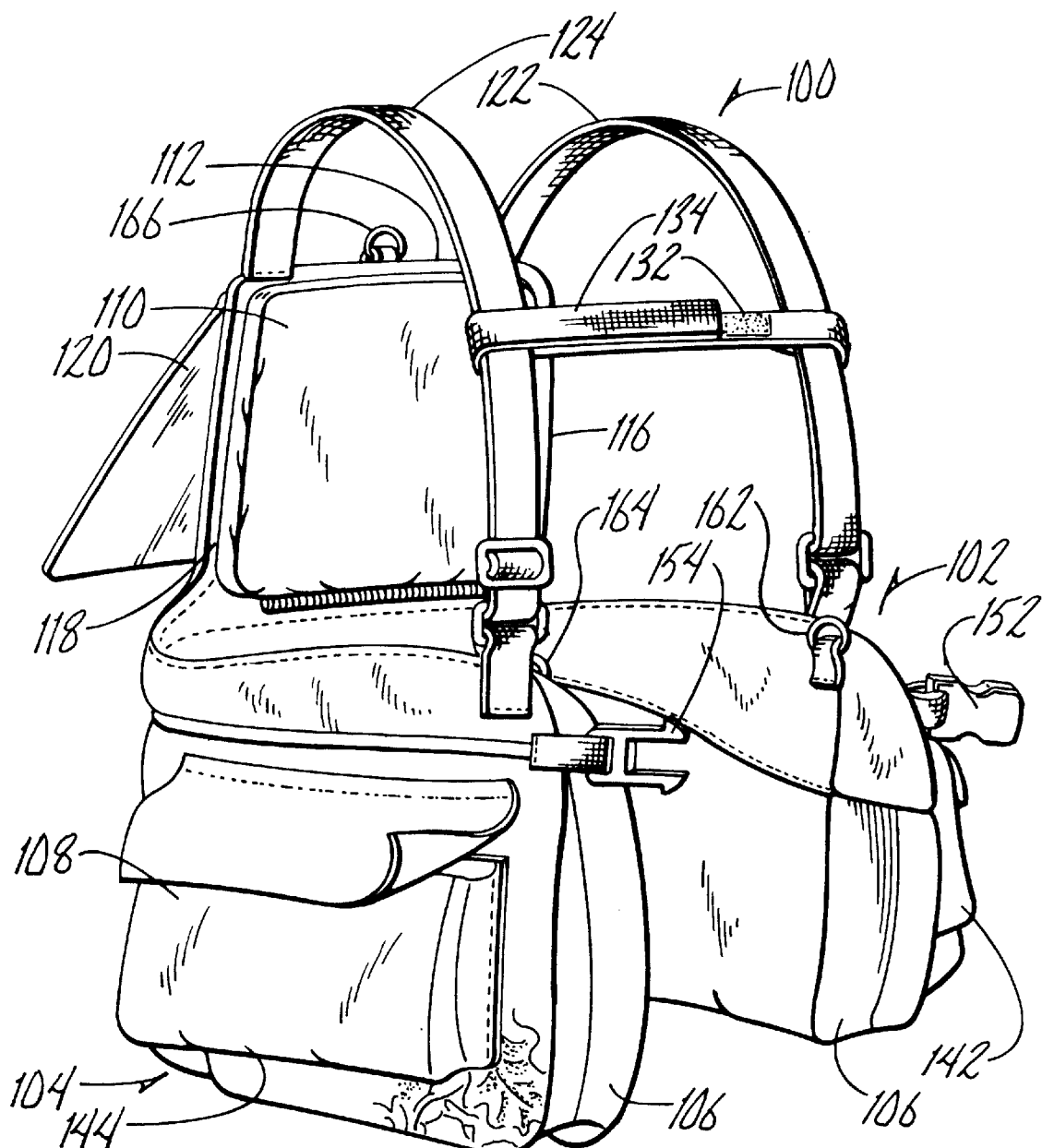
FIG. 1 is a perspective view of a preferred embodiment of the present invention which shows the vest as it would be configured when worn by a hunter with the sternum straps fastened, thereby connecting the right and left shoulder straps.

Now referring to the drawings, where like numerals refer to like matter throughout, and more particularly to FIG. 1, there is shown a perspective view of a preferred embodiment of the present invention generally designated 100, having a left side 102 and a right side 104. Note: Left and right as used herein will denote the left and right side of the wearer of the vest. i.e. the left side 102 would be on the left side of a wearer (not shown) of the apparatus 100. Left side 102 is shown on the right side of FIG. 1. Each side 102 and 104 are shown having a front end 106 and a back end 108. Interconnecting sides 102 and 104 along their back ends 108 is back side 110 which has a top edge 112, left edge 116 and a right edge 118. A safety flap 120, which is preferably hunter's orange in color, is attached to the back side 110. Extending from top edge 112 and right edge 118 to the front end 106 of right side 104 is right shoulder strap 124. Left shoulder strap 122 similarly extends from left edge 116 and top edge 112 to front end 106 or left side 102. Interconnecting shoulder straps 124 and 122 are left sternum strap 132 and right sternum strap 134.

Left and right sides 102 and 104 have pockets 142 and 144 respectively and are connected by belt ends 152 and 154. Left side 102 and right side 104 may be constructed of any material used for apparel or for bags etc. Preferably the material is light, flexible, quiet when touched, durable, water resistant and affordable. One suitable material is a soft cotton twill; however, any suitable fabric, netting or matter could be used. Often the material is printed with a camouflage pattern to help the hunter remain visually undetected by any game animals. Also various other pockets, sub-pockets, dividers, compartments and other holders may be included throughout the apparatus 100 to customize the design for particular types of hunters.

Back side 110 may be constructed of material similar to left side 102 and right side 104. Preferably, back side 110 includes therein a pad made of foam or other suitable cushioning material. This pad will help cushion the hunter's back, especially if it is positioned between the hunter and a tree against which the hunter is leaning or reclining.

Shoulder straps 122 and 124 and sternum straps 132 and 134 are preferably constructed of a material which has high tensile strength and is durable, such as nylon strap; however, other suitable material could be used. Preferably sternum straps 132 and 134 are connected with an adhesive material such as Velcro; however, other methods could be used as well, such as buttons, snaps, zippers, tie strings, etc.

Also shown in FIG. 1 are rings for hanging the vest in a tree. Left ring 162 and right ring 164 are sewn into left side 102 and right side 104 respectively. A center ring 166 is disposed on the top edge 112 of back side 110. These rings are preferably "D" rings made of a suitable metal or other strong and durable material, but other shaped rings could be used as well. Also, loops, button holes, clips, tie strings and any other material or devices used for connecting objects could be used.

In operation, and now referring to FIG. 2, there is shown the apparatus of the present invention, generally designated 100, together with a tree belt, generally designated 200. Apparatus 100 is described herein as being a vest; however, other apparel, such as shirts, jackets, and waist-worn packs often known as "fanny packs" could be used as well. Apparatus 100 is shown hung from belt 200 by interconnection at the rings 162, 164 and 166 with various clips and straps discussed below. For example, right ring 164 is connected through hanging strap 202 to tree belt 200. Preferably, hanging strap 202 is capable of sliding along tree belt 200 to accommodate various types and sizes of trees. Center ring 166 is shown coupled to tree belt 200. Preferably the rings 162, 164 and 166 are capable of quickly connecting and disconnecting from tree belt 200 and hanging strap 202 while at the same time are strong and durable. Various snaps and connectors could be used and are largely a matter of personal preference. Tree belt 200 is preferably adjustable to fit snugly around trees of various sizes and a belt buckle 204 is included. Also shown in FIG. 2 is an additional hanging hook 206 for hanging other equipment (not shown) that a hunter may use while on stand. In operation, the hunter would typically wear the apparatus 100 while walking to the tree. When the hunter arrives at the tree, the tree belt 200 would be extended around the tree and the apparatus 100 would be removed and attached to the tree belt. The back side 110, with its pad therein, could be used by the hunter as a back cushion when leaning against the tree.

It is thought that the method and apparatus of the present invention will be understood from the foregoing description, and it will be understood from the foregoing description that it will be apparent that various changes may be made in the form, construction, steps and the arrangement of the parts and steps, without departing from the spirit and scope of the invention or sacrificing all of their material advantages, the form herein being merely preferred or exemplary embodiments thereof.

What is claimed is:

1. A method of using hunting accessories including the steps of:

providing a vest with flexible right and left sides each having pockets therein;

depositing hunting accessories in said pockets;

positioning said vest around a human torso, so that said pockets are disposed on opposite flanks of said torso;

positioning a flexible member around a tree;

removing said vest from around said human torso; and, hanging said vest from said flexible member so that said vest extends around at least a portion of said tree.

2. A method of claim 1 further comprising the steps of;

providing a pad on a back portion of said vest;

positioning said vest around said tree so that said pad can be used as a cushion by a person leaning against said tree.

* * * * *